(12) United States Patent
Khalil (10) Patent No.: US 6,733,665 B1
(45) Date of Patent: May 11, 2004

(54) STORM DRAIN SYSTEM FOR PREVENTING AND FILTERING DEBRIS, TRASH AND HYDROCARBONS WITH REMOVABLE INSERTS

(76) Inventor: Saleh S. Khalil, 2832 E. Puritan Pl., Anaheim, CA (US) 92806

( * ) Notice: Subject to any disclaimer, the term of this patent is extended or adjusted under 35 U.S.C. 154(b) by 58 days.

(21) Appl. No.: 10/138,834

(22) Filed: May 6, 2002

Related U.S. Application Data (63) Continuation-in-part of application No. 09/789,661, filed on Feb. 22, 2001, now abandoned.

(51) Int. Cl.[7] .................................................. E03F 5/06
(52) U.S. Cl. ....................... 210/122; 210/125; 210/131; 210/156; 210/163; 404/4
(58) Field of Search ................................ 210/122, 123, 210/125, 131, 156, 163, 164, 170; 404/4, 5

(56) References Cited

U.S. PATENT DOCUMENTS

| | | |
|---|---|---|
| 248,559 A | 10/1881 | Jackson |
| 440,067 A | 11/1890 | Smith |
| 506,267 A | 10/1893 | Sefton |
| 809,201 A | 1/1906 | Lutz |
| 1,066,316 A | 7/1913 | Piper |
| 1,220,123 A | 3/1917 | Heybach |
| 1,245,903 A | 11/1917 | Gross |
| 2,517,195 A | 8/1950 | Gaspar |
| 5,223,154 A | 6/1993 | MacPherson, Jr. |
| 5,232,587 A | 8/1993 | Hegemier et al. |
| 5,264,134 A | 11/1993 | McCamy |
| 5,275,943 A | 1/1994 | DiTuro |
| 5,284,580 A | 2/1994 | Shyh |
| 5,326,703 A | 7/1994 | Hazen et al. |
| 5,345,741 A | 9/1994 | Slater et al. |
| 5,350,527 A | 9/1994 | Kitko |
| 5,358,607 A | 10/1994 | Ellis |
| 5,372,714 A | 12/1994 | Logue, Jr. |
| 5,372,715 A | 12/1994 | Maggard et al. |
| 5,376,264 A | 12/1994 | Betancourt |
| 5,383,745 A | 1/1995 | Shannon |
| 5,397,464 A | 3/1995 | Hannon |
| 5,405,539 A | 4/1995 | Schneider |
| 5,480,254 A | 1/1996 | Autry et al. |
| 5,820,762 A | 10/1998 | Bamer et al. |
| 6,015,489 A | 1/2000 | Allen et al. |
| 6,106,706 A | 8/2000 | Roy et al. |
| 6,106,707 A | 8/2000 | Morris et al. |
| 6,217,756 B1 | 4/2001 | Martinez |

Primary Examiner—Christopher Upton
(74) Attorney, Agent, or Firm—William W. Haefliger (57) ABSTRACT

A prevention system is provided for disallowing trash from entering a catch basin during a dry season, and employing an apparatus attached to the opening of a storm drain and having a plate movable between open and closed positions, and operated by an insert placed inside the storm drain catch basin, a water filtering replaceable bag or bags placed in the insert, and a water receiving canister below the bag or bags. Contaminants are removed from water that is used to impose weight to open the plate and then discharged.

12 Claims, 7 Drawing Sheets

STORM DRAIN SYSTEM FOR PREVENTING AND FILTERING DEBRIS, TRASH AND HYDROCARBONS WITH REMOVABLE INSERTS

This application is a continuation-in-part or prior U.S. application Ser. No. 09/789,661, filed Feb. 22, 2001, now abandoned.

BACKGROUND OF THE INVENTION

This invention relates to the prevention of substantial amounts of contaminant from entering a storm drain system during a dry season while allowing for low flow due to irrigation or cleaning to be intercepted by inserts and purification of water which may be storm runoff. Industrial process water or cleaning water pours into drains such as found in parking areas, gas stations, along streets in municipalities and similarly heavily traveled locations. This invention relates to a system that removes debris, trash, hydrocarbon and similar contaminates as well as other contaminates from storm water prior to releasing the water into the municipal disposal system of the environment.

Great concern has been generated among the public for ensuring the purity of the domestic water supply in view of the revelation that small traces of contaminants pose a serious threat to public health and particularly children. As a result of this concern, the Clean Water Act (1972) and the Water Quality Act (1987) resulted in establishing the NPDES Program (National Pollutant Discharge Elimination System). The NPDES Program requires permitting in cases of storm water discharges associated with industrial, commercial, municipal, and/or residential activity which may be contaminating run-off water by over-burden, raw material, intermediate product, finished product, by-product or waste product. In addition, many cities, counties, and districts have enacted similar laws. The site of such activities can include large parking facilities where large amounts of run-off are generated containing significant amounts of gas and similar anthropogenic organics as well as heavy metals. Provisions of the program include establishing a monitoring program and instituting Best Management Practice (BMP) to achieve practicable pollutant reduction. These activities demonstrate the need for a system that removes debris, trash, hydrocarbons and other contaminants from storm water, prior to release into a municipal disposal system, or environment.

Numerous techniques have been described for removing contaminants, particularly hydrocarbons including oils, from storm water. None of such techniques, to my knowledge adequately meet the above described needs through provision of the unusually advantageous structures, modes of operation, and results as described herein.

SUMMARY OF THE INVENTION

It is a major object of the invention to provide a prevention system disallowing trash from entering the catch basin during dry season by means of an apparatus attached to the opening of a storm drain and operated by an insert placed inside the storm drain catch basin.

It is another object to provide increased capacity of the storm drain at the beginning of a storm.

Another object is to minimize construction retrofit to existing storm drains by adapting the shape and design of the apparatus to fit existing storm drain catch basins.

It is a further object of this invention to provide a plate at the mouth of the curb inlet to direct flow into inserts.

It is yet another object of this invention to provide removable and replaceable inserts to remove contaminates, particularly debris, trash, oils, fuels and other hydrocarbons and pesticides and organically bound inorganics from water being discharged from the surrounding into a public water disposal system such as a sanitary sewer or storm drain. Such inserts typically receive and contain trash and debris from runoff.

Another objective is provision of such bags to be removable and replaceable easily, through the curb opening of a catch basin.

It is another object that the insert filter be constructed for removing contaminants having a wide range of properties for various uses.

It is another object that the filter drain be constructed such that replacement of spent filters is easily accomplished with maximum protection to the operator in terms of cleanliness and personal safety.

An important object is to facilitate installation and maintenance of system components resulting in saving in labor and improved efficiency.

It is another object that the spent filter media may be disposable conveniently and economically.

It is another object that the filter drain be constructed to prevent malfunctions such as clogging or re-floating that might otherwise arise from circumstances such as unexpected flooding.

A yet further object is to provide an improved system as discussed herein, or as claimed herein.

These and other objects will become apparent from a study of the description and study of the drawings.

DETAILED DESCRIPTION

Figure 1:
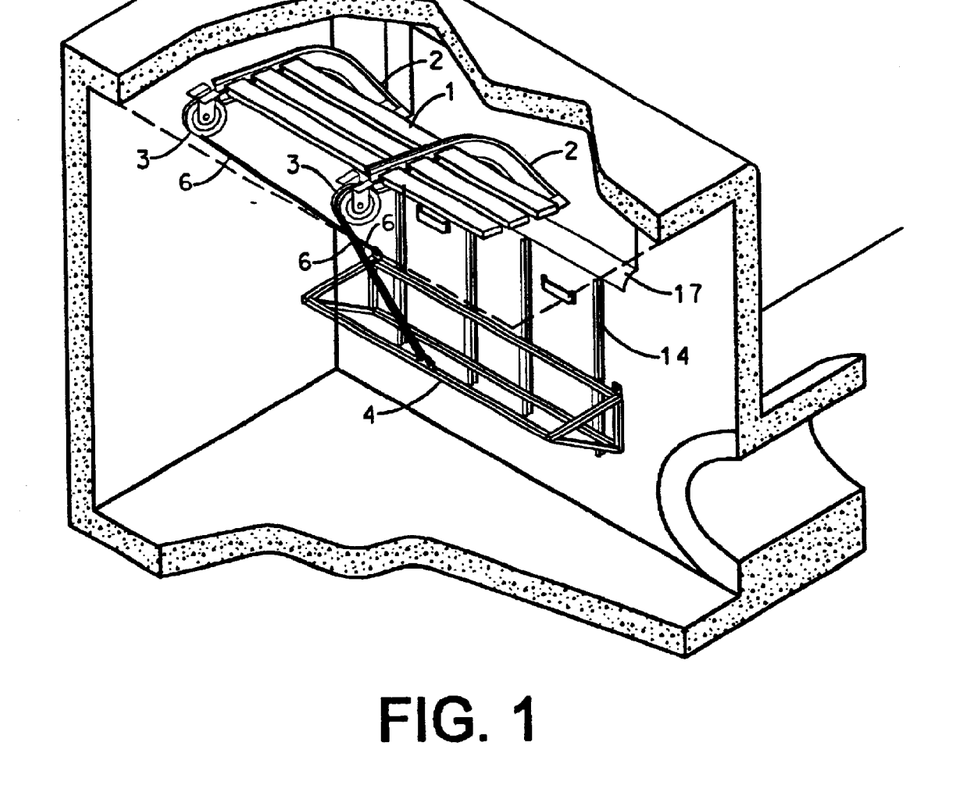
FIG. 1 is a perspective view of preferred apparatus incorporating the invention, and with a catch basin open.

FIG. 1 shows a curb opening catch basin and apparatus incorporating the invention at that location. The apparatus includes two guide rails 2 which are horizontally spaced apart and extend in generally parallel, partly curved relation. Those two rails are suitably and fixedly mounted on catch basin structure. A guard rail or rails 1 are carried by and movable on the guide rails, as between FIG. 1 position, in which the basin-entrance is open, and FIG. 2 position in which the basin is closed.

Each of two parallel cables 6 is connected between the rail or rails 1 and a horizontal member of a frame 4 which is at a lower location. Each cable 6 travels over a pulley 5 in faxed position and suitably supported as by the catch basin or ceiling.

Figure 2:
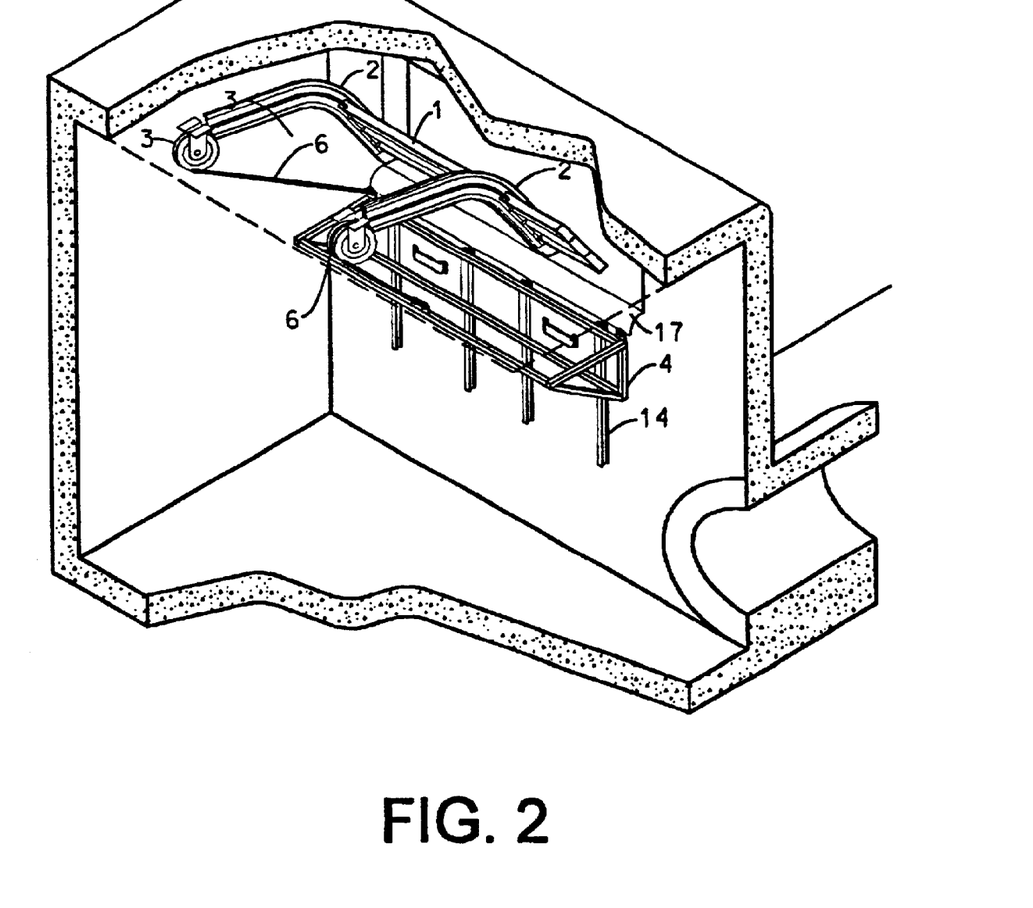
FIG. 2 is a view like FIG. 1, but showing closing of the catch basin.

Plate 17 directs the flow into the catch basin. A fixed frame 14 is mounted to the front face of the catch basin. FIG. 2 shows movable frame 4 resting on fixed frame 14, in closed position of the mechanism.

Figure 3:
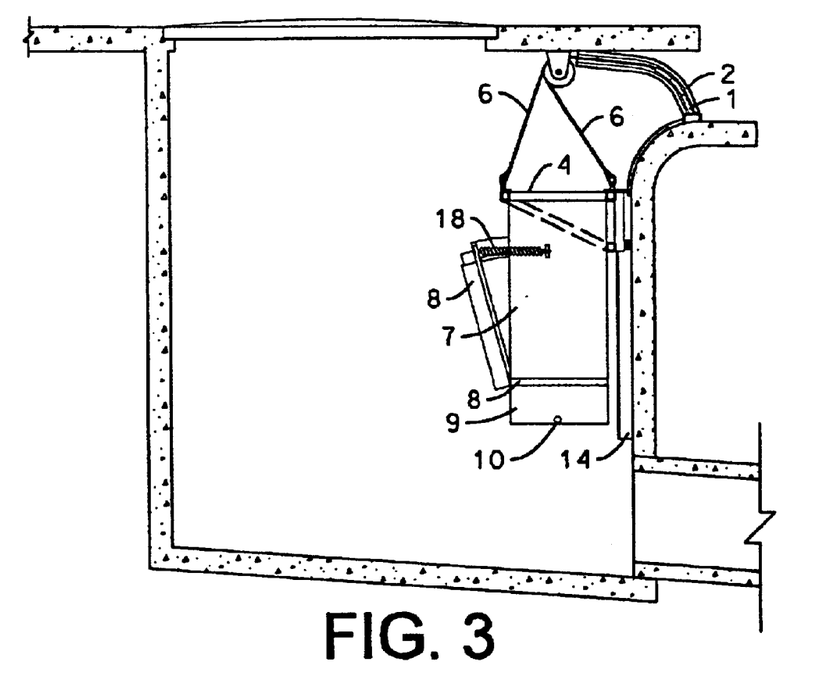
FIG. 3 is a view taken in vertical section, and showing the apparatus as seen in FIG. 2.
Figure 4:
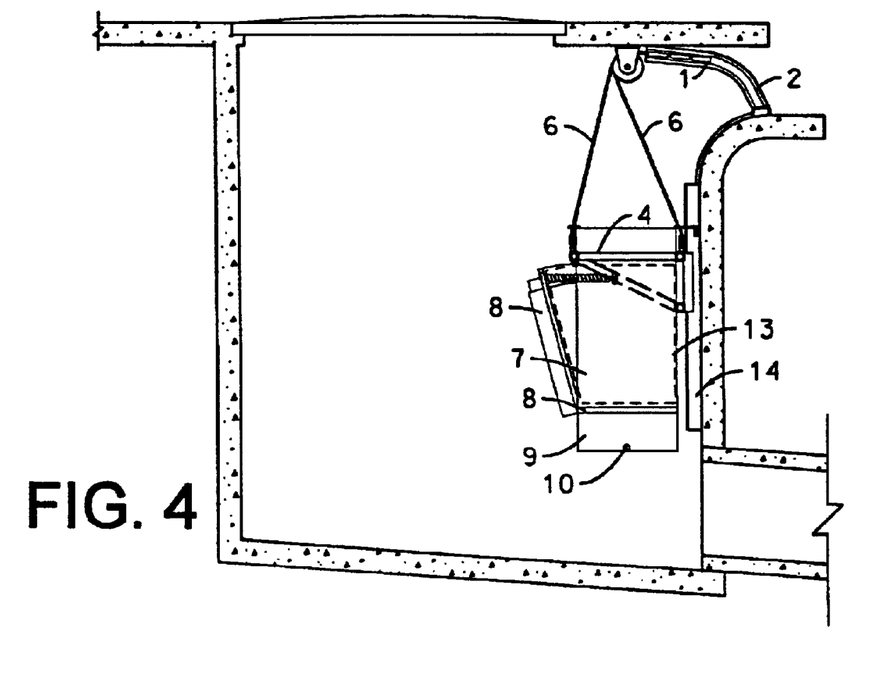
FIG. 4 is a sectional view like FIG. 3, but showing the apparatus as in FIG. 1.
Figures 5, 6:
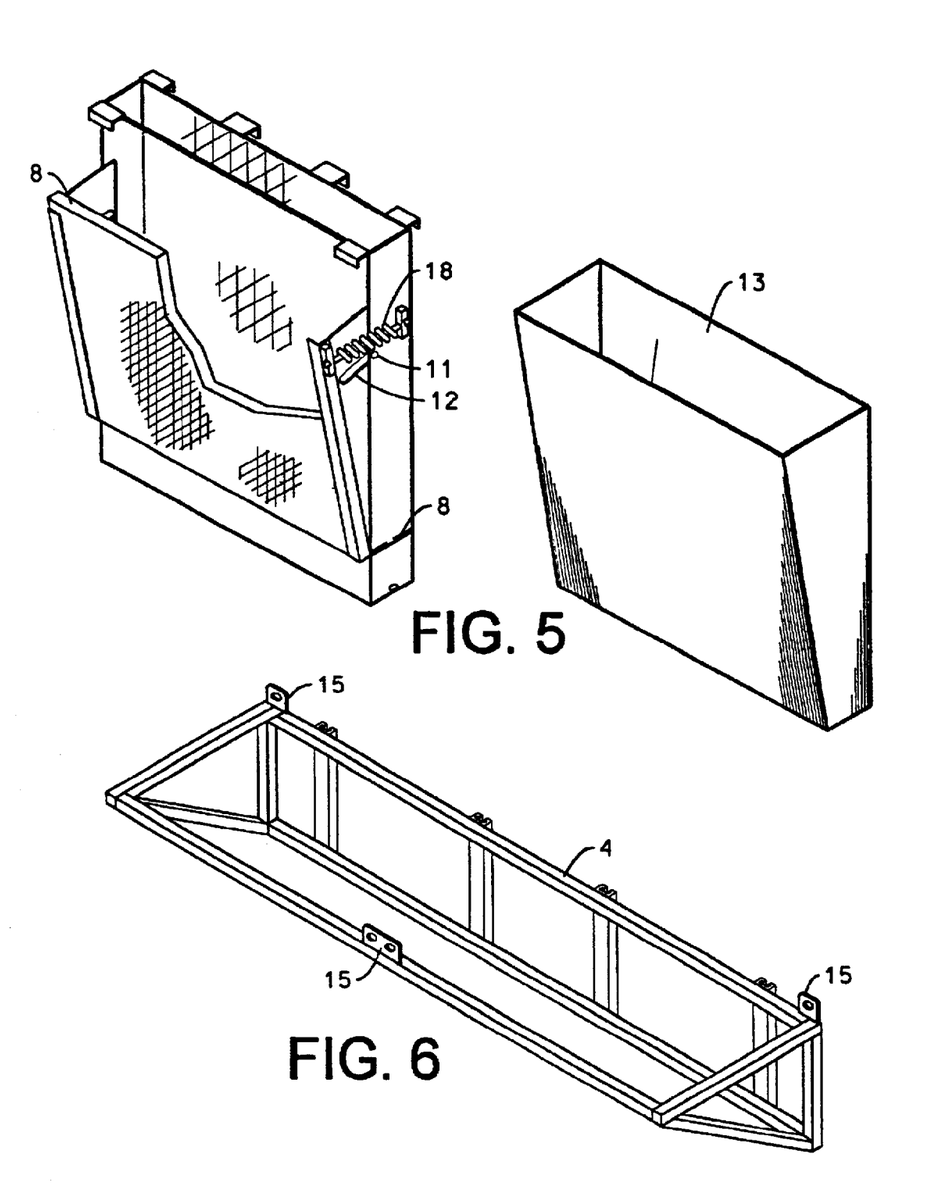
FIG. 5 is an exploded perspective showing of the wire mesh basket and bag.
FIG. 6 is a perspective view of the apparatus frame.

FIGS. 3–5 shows an insert 7 resting on frame 4; removable bag 13 fitted in insert 7; removable oil filter 8; canister 9; orifice 10; pin 11; slit 12; cable 6; guide rail 2; and a spring 18.

FIG. 4 shows the mechanism in open position.

Figure 7:
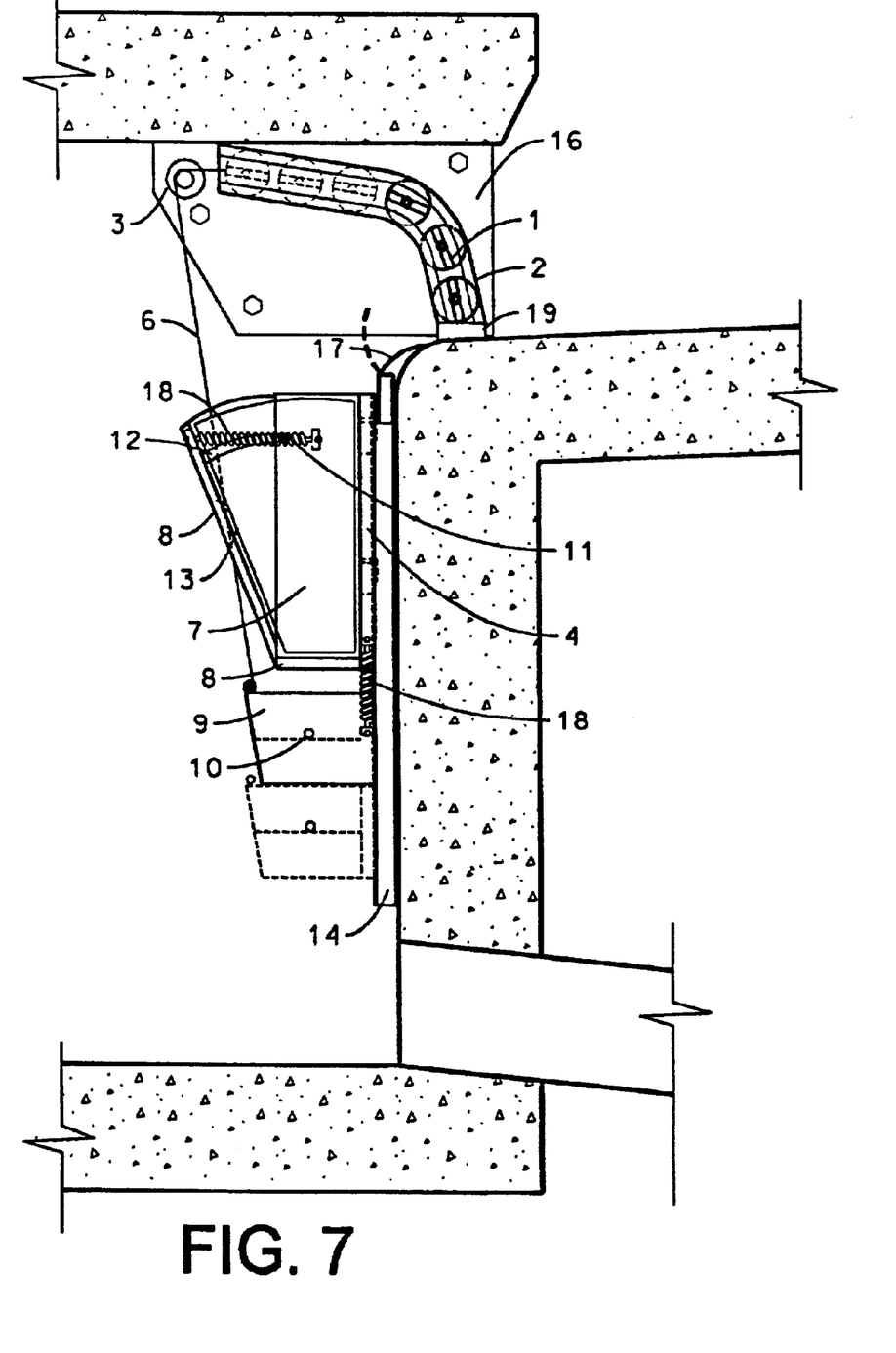
FIG. 7 is a vertical section showing modified apparatus, incorporating the invention.

FIG. 7 shows a removable wire mesh basket insert 7; removable and replaceable bag 13; oil filter 8 near the bottom of insert 7; spring 18, slit 12 and pin 11.

FIGS. 6 and 7 shows a frame 4 attached to vertical beam or beams 14 that are in turn attached to the catch basin well or wells; and hooks 15 attached to frame 4.

FIG. 7 shows a housing, and a frame 4 as before. Also shown are canister 9, spring 18, whereby the canister functions to open and close the catch basin opening, by downward flow interception, and flow escape or release through small orifice 10. Also, the reduced horizontal spacing at 19 between the street gutter level and the lower ends of the guard rails 1 allows for low flow such as irrigation water flow to pass and be intercepted. It is possible as in case of hazard, to employ a rubber strip carried by the mechanism to completely or near completely close spacing 19, preventing flow from entering the catch basin.

In use or operation of the suspended system shown in FIGS. 1–7, storm water is intercepted and passes through insert bag 13 then through filter at the bottom of basket 7 and through perforations in the bottom and side of basket 7 and flows to canister 9 which has a number of orifices designed to allow slow emptying of the canister, and hence closing of the guard rails 1. The suspended insert bag 13 is made of permeable material, but its bottom is not permeable to intercepted debris.

Figure 8:
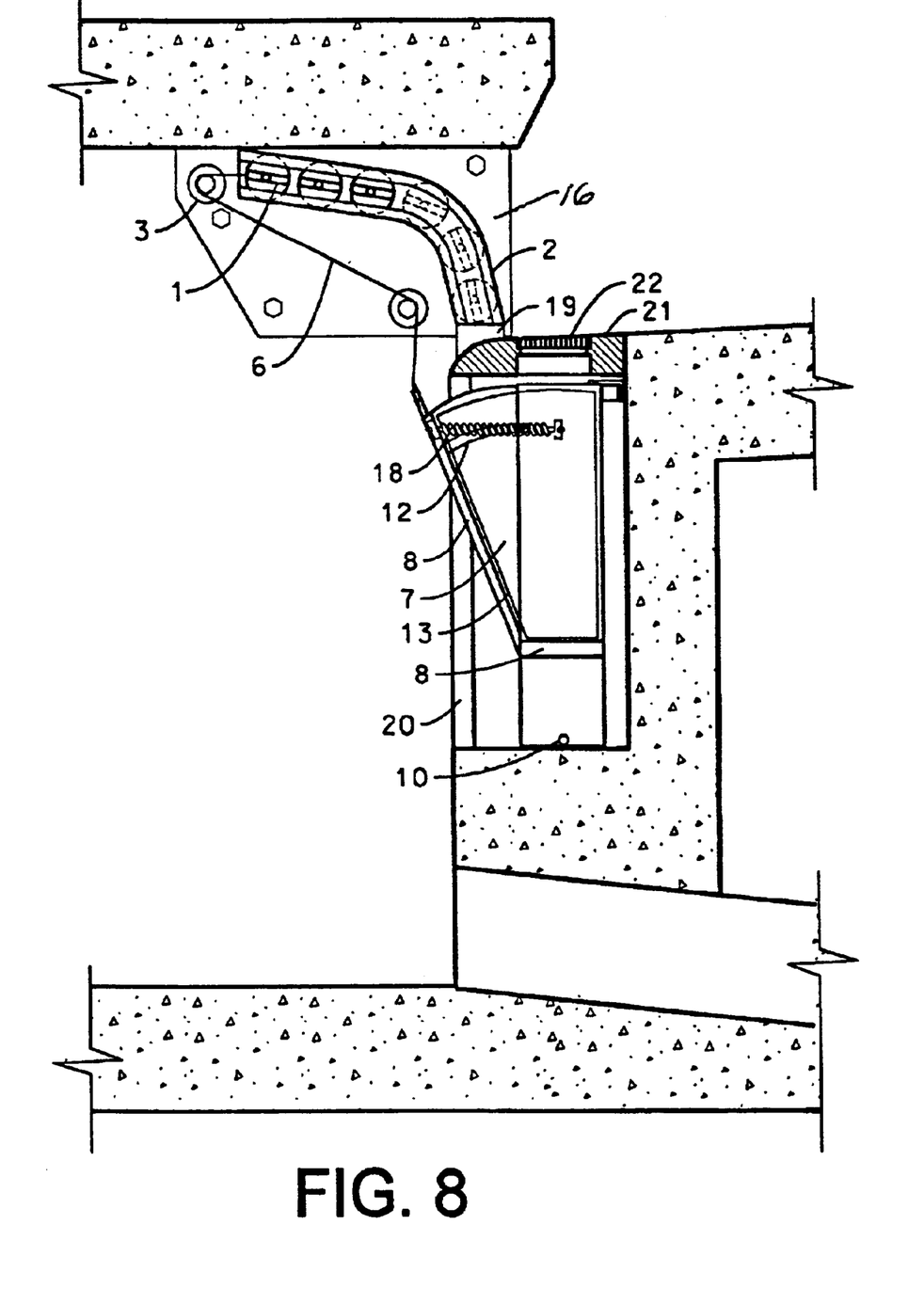
FIG. 8 is a vertical section taken through further modified apparatus incorporating the invention.

FIG. 8 shows an alternative mechanism, having corresponding parts bearing the same numbers. It is partly recessed into the curb structure, and employs grates 22 to pass curb water downwardly. A plate 16 is mounted to the side wall of the catch basin, and carries pulley 3. A fixed frame is fixed to the front wall of the catch basin. That frame, made of suitable material, can be inserted from the street opening side of the catch basin, the insert frame 4, as before, carrying the insert basket, slides over the fixed frame.

Figures 9, 10:
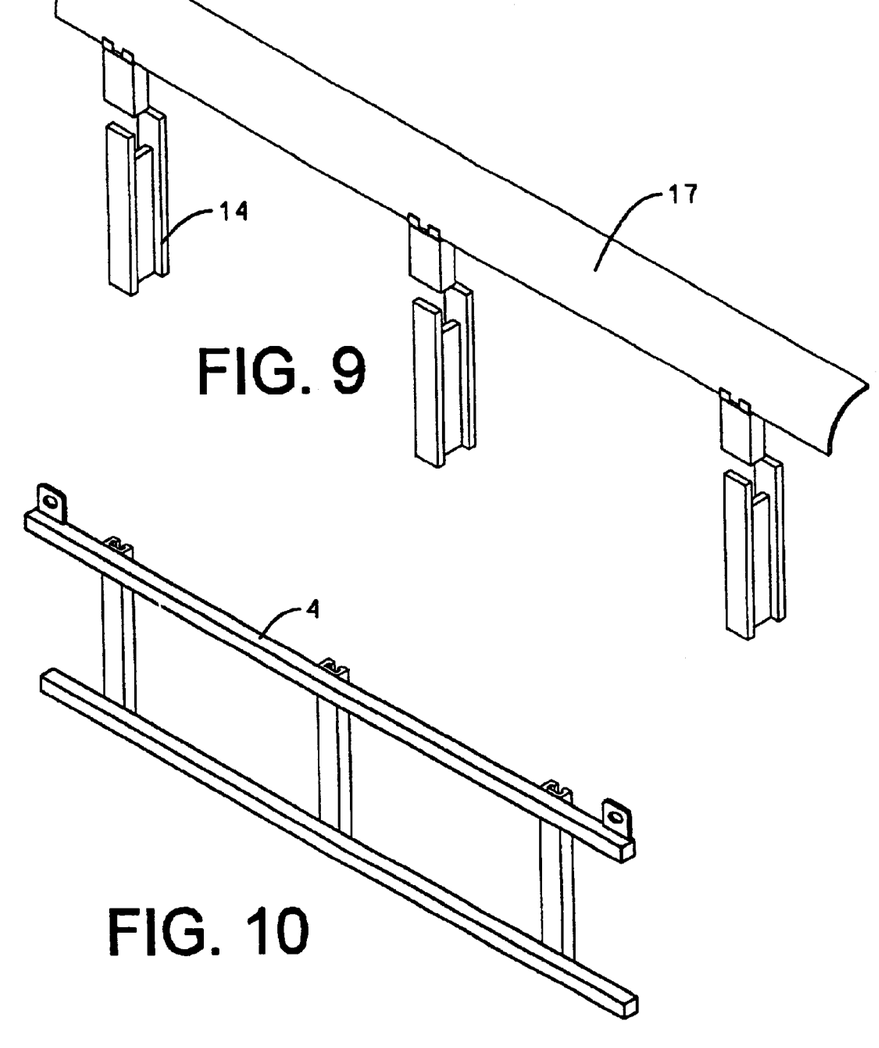
FIG. 9 is a perspective view of a steel plate and associated elements, as used in the apparatus.
FIG. 10 is a perspective view of a frame, as used in the apparatus.

FIG. 9 shows curved plate 17 on fixed frame; it can be removed, if necessary. FIG. 10 shows vertical frame 4.

In operation, if the downstream drain system malfunctions, the flow in the catch basin will rise, releasing pressure on cable 6, causing rail 1 to move toward closed position, the floatable canister rising and rising of basket 7 toward the ceiling of the catch basin, preventing contaminates from spilling, and preventing street flow from mixing with filtered flow.

Accordingly, canister 9 controls opening and closing of the basin inlet from the street.

As referred to herein, and as shown in the drawings, one preferred system includes:

A system for preventing, filtering and removing pollutant from storm water passing into a curb opening of a catch basin, said system comprising one or more faceplates about the same size as said catch basin opening, said faceplate or faceplates closing said opening, there being an insert suspended in the catch basin and operatively connected to the faceplate or faceplates to displace the faceplate or faceplates from closed to open positions in response to storm water flow into the catch basin, said insert having a floatable canister for preventing pollutant from mixing with said flow when the catch basin malfunctions or has high capacity run off, there being an insert frame and a cable affixed to both the faceplate and the insert frame, there also being at least two cable guide pulleys operatively attached to a wall or walls of the catch basin near the top of said catch basin, the cable suspending said insert at the catch basin, there being a bag or bags carried by said frame, the insert defining a mesh, the bag or bags including water permeable filter material, whereby water flows through the mesh and then through the bag or bags, trash and debris being trapped by the mesh or the bag or bags for causing the insert to slide down thereby pulling the cable to lift the faceplate or faceplates to open position, the frame supporting said insert inside said catch basin such that water entering the curb opening passes into said insert and through the bag or bags.

As noted, the use of elements as referred to provides for multiple advantages including faceplate or gate operation to open and allow trash in-flow; clean (filtered) water collection to effect such operation; and removal of contaminants from the water to be collected to operate the system. Also, the filter bags are easily retrievable, without disturbing the insert or the lower canister.

I claim:

1. A flow and debris control system at a storm drain catch basin comprising a flow control gate having a normally closed position in which the gate provides a reduced size flow entrance to the basin in which travel of debris into the basin is blocked, and having a fully open position in which debris can travel into the basin, and a water flow collector and filter in the path of water flows into the basin via said reduced size flow entrance, and a faceplate or faceplates, said collector connected to the faceplate or faceplates to move same to freely open position in response to said water flow via said reduced size flow entrance, the collector including an insert having a mesh, a replaceable filter bag, in the insert and a water collection canister below the bag.

2. The system of claim 1 wherein said collector includes an insert, the canister providing means movable to avoid pollutant from mixing with water flow when the catch basin malfunctions or has high capacity run off.

3. A system for preventing, filtering and removing pollutant from storm water passing into a curb opening of a catch basin, said system comprising one or more faceplates about the same size as said catch basin opening, there being an insert suspended in the catch basin and operatively connected to the faceplate or faceplates to displace the faceplate or faceplates from closed to open positions in response to storm water flow into the catch basin, said insert having a floatable canister for preventing pollutant from mixing with said flow when the catch basin malfunctions or has high capacity run off, there being an insert frame and an insert frame cable affixed to both the faceplate and the insert frame, there also being at least two cable guide pulleys operatively attached to a wall or walls of the catch basin near the top of said catch basin, there being a bag or bags carried by said frame, the insert defining a mesh, the bag or bags including water permeable filter material, whereby water flows through the mesh and then through the bag or bags, trash and debris being trapped by the mesh or the bag or bags for causing the insert to slide down thereby puling the cable to lift the faceplate or faceplates to open position, the frame supporting said insert inside said catch basin such that water entering the curb opening passes into said insert and through the bag or bags.

4. The system of claim 3 including a canister at the bottom of the insert whereby said canister when filled with water will cause the opening of the catch basin faceplate and closing of said faceplate when flow is discharged through one or more orifices defined at the canister's side.

5. The system in claim 3 whereas the frame is sized and positioned for causing opening of the faceplate by the weight of trash and debris and flow in the canister and in said inserts when storm water is received therein.

6. The system of claim 3 wherein each bag has a mesh size selected to permit flow of water through two sides of said bag, through the mesh and out through a filter medium carried by said insert without substantial accumulation of water in said insert.

7. The system of claim 3 wherein each bag is replaceable and removable and positioned to collect trash and debris and with the filter medium in the outer side of said insert collecting fluid contaminates.

8. The system of claim 3 including guide rails placed at two vertical sides of said catch basin for supporting said inserts.

9. The system of claim 3 including means for supporting said insert, and which comprises a frame resting upon said catch basin front wall.

10. The system of claim 3 wherein said filter medium is an oil filter.

11. A system comprising one or more water receptacles in a water and trash storm drain catch basin, and one or more faceplates operatively connected to the water receptacle to open and close the faceplate or faceplates at an entrance to the catch basin in response to an amount of storm water coming into said storm drain, the faceplate or faceplates in closed position defining a lower entrance of reduced size, and wherein the system includes one or more floating devices providing a means to float collected trash or debris in order to prevent contaminants from re-entering into the downstream drainage system and to prevent clogging of said system in case of overflow or backflow.

12. A water collector in a catch basin connected to a basin faceplate opening and closing the entrance to the catch basin in response to the amount of water coming into the basin, and wherein the collector has an insert with a mesh, a filter bag and a water collection canister below the bag; and a floatable device connected to the insert.

* * * * *